US011483140B2

(12) United States Patent
Prisco et al.

(10) Patent No.: US 11,483,140 B2
(45) Date of Patent: Oct. 25, 2022

(54) SECURE OUT-OF-BAND SYMMETRIC ENCRYPTION KEY DELIVERY

(71) Applicant: QUANTUMXCHANGE, INC., Bethesda, MD (US)

(72) Inventors: John Prisco, Bethesda, MD (US); Gene Savchuk, Potomac, MD (US); Gary Benedetti, Derwood, MD (US); Eric Hay, Arlington, VA (US); Aliki Marinos, Kensington, MD (US); Stacey Sweeney, Vienna, VA (US)

(73) Assignee: QUANTUMXCHANGE, INC., Bethesda, MD (US)

( * ) Notice: Subject to any disclaimer, the term of this patent is extended or adjusted under 35 U.S.C. 154(b) by 256 days.

(21) Appl. No.: 16/530,987

(22) Filed: Aug. 2, 2019

(65) Prior Publication Data
US 2021/0036845 A1 Feb. 4, 2021

(51) Int. Cl.
*H04L 9/08* (2006.01)
*H04L 67/104* (2022.01)
*H04L 67/1001* (2022.01)

(52) U.S. Cl.
CPC ............ *H04L 9/0827* (2013.01); *H04L 9/083* (2013.01); *H04L 9/0852* (2013.01); *H04L 67/1001* (2022.05); *H04L 67/104* (2013.01)

(58) Field of Classification Search
CPC ..... H04L 9/0827; H04L 9/083; H04L 9/0852; H04L 67/1002; H04L 67/104
See application file for complete search history.

(56) References Cited

U.S. PATENT DOCUMENTS

| 5,768,873 | A | 6/1998 | Stiller et al. |
| 7,113,598 | B2 | 9/2006 | Flusberg et al. |
| 7,178,277 | B2 | 2/2007 | Takeuchi |
| 7,181,011 | B2 | 2/2007 | Trifonov |
| 7,430,295 | B1 | 9/2008 | Pearson et al. |
| 7,457,416 | B1 | 11/2008 | Elliott |

(Continued)

FOREIGN PATENT DOCUMENTS

WO 20120044855 4/2012

OTHER PUBLICATIONS

Cao Yuan et al: "Cost-efficient quantum key distribution (QKD) over WDM networks", Journal of Optical Communica-tions and Networking, US, vol. 11, No. 6, Jun. 1, 2019 (Jun. 1, 2019), pp. 285-298, XP011729309, ISSN: 1943-0620, DOI: 10.1364/JOCN.11.000285 (Year: 2019).*

(Continued)

*Primary Examiner* — Trang T Doan
(74) *Attorney, Agent, or Firm* — Womble Bond Dickinson (US) LLP

(57) ABSTRACT

Trusted nodes in a network perform secure out-of-band symmetric encryption key delivery to user devices. A first trusted node receives a request from a first user device to deliver symmetric encryption keys to the first user device and a second user device, as a pair of user devices. The first trusted node delivers a second symmetric encryption key to the second user device, via trusted nodes. The first trusted node receives confirmation of delivery of the second symmetric encryption key. Responsive to the confirmation of delivery, the first trusted node delivers the first symmetric encryption key to the first user device.

20 Claims, 4 Drawing Sheets

(56) References Cited

U.S. PATENT DOCUMENTS

| | | | |
|---|---|---|---|
| 7,512,242 | B2 | 3/2009 | Pearson et al. |
| 7,646,873 | B2 | 1/2010 | Lee et al. |
| 7,706,535 | B1 | 4/2010 | Pearson et al. |
| 7,792,288 | B2 | 9/2010 | Kollmitzer |
| 7,889,868 | B2 | 2/2011 | Wellbrock et al. |
| 8,650,401 | B2 | 2/2014 | Wiseman et al. |
| 8,681,982 | B2 | 3/2014 | Wiseman et al. |
| 8,903,094 | B2 | 12/2014 | Bovino |
| 8,964,989 | B2 | 2/2015 | Grice |
| 9,264,225 | B1 | 2/2016 | Hunt et al. |
| 9,698,979 | B2 | 7/2017 | Armstrong et al. |
| 10,291,400 | B2 | 5/2019 | Tanizawa |
| 10,432,395 | B2 | 10/2019 | Howe et al. |
| 10,554,397 | B2 | 2/2020 | Howe et al. |
| 2005/0286723 | A1 | 12/2005 | Vig et al. |
| 2007/0174485 | A1* | 7/2007 | McClain .............. H04L 63/083 709/238 |
| 2008/0098464 | A1* | 4/2008 | Mizrah ................ G06F 21/36 726/5 |
| 2009/0262942 | A1* | 10/2009 | Maeda ................ H04L 9/0855 380/278 |
| 2010/0293380 | A1 | 11/2010 | Wiseman |
| 2011/0307962 | A1* | 12/2011 | Ohbitsu ................ G06F 21/10 726/26 |
| 2013/0083926 | A1* | 4/2013 | Hughes ................ H04L 9/3247 380/278 |
| 2013/0101121 | A1* | 4/2013 | Nordholt ............ H04L 9/3226 380/279 |
| 2015/0222619 | A1* | 8/2015 | Hughes ................ H04L 9/0852 713/168 |
| 2016/0248581 | A1 | 8/2016 | Fu et al. |
| 2016/0285629 | A1 | 9/2016 | Tanizawa |
| 2017/0346627 | A1* | 11/2017 | Alleaume ............ H04L 9/0844 |
| 2018/0013556 | A1* | 1/2018 | Saavedra .............. H04L 67/12 |
| 2019/0103962 | A1* | 4/2019 | Howe .................. G06F 21/606 |
| 2019/0260581 | A1* | 8/2019 | Su ...................... H04L 9/0855 |
| 2020/0076600 | A1 | 3/2020 | Driever et al. |
| 2020/0076807 | A1 | 3/2020 | Driever et al. |
| 2020/0351086 | A1 | 11/2020 | Walenta et al. |
| 2020/0351087 | A1 | 11/2020 | McCandlish et al. |
| 2021/0044433 | A1 | 2/2021 | Hay et al. |

OTHER PUBLICATIONS

Cao Yuan et al: "Cost-efficient quantum key distribution (QKD) over WDM networks", Journal of Optical Communications and Networking, Institute of Electrical and Electronics Engineers, US, vol. 11, No. 6, Jun. 1, 2019 (Year: 2019).*

Dijkstra, E.W., "A Note on Two Problems in Connexion with Graphs," Numerische Mathematik, Jun. 11, 1959, pp. 269-271, vol. 1, Amsterdam.

ETSI QKD Industry Specification Group, Sep. 24, 2015, <https://web.archive.org/web/20150924015201/http://www.etsi.org/technologies-clusters/technologies/quantum-key-distribution>.

Gisin, et al., "Quantum cryptography," Reviews of Modern Physics, Jan. 2002, pp. 145-195, vol. 74, The American Physical Society.

Hughes, et al., "Network-Centric Quantum Communications with Application to Critical Infrastructure Protection," 2013.

Langer, et al., "Standardization of quantum key distribution and the ETSI standardization initiative ISG-QKD," New Journal of Physics, Jan. 26, 2009, 17 pgs., vol. 11, IOP Publishing Ltd and Deutsche Physikalische Gesellschaft.

Mu-Hyun, C., "SK Telecom develops quantum key switching tech," ZDNet, Jun. 28, 2019, 7 pgs., <https://www.zdnet.com/article/sk-telecom-develops-quantum-key-switching-tech/>.

Peev, et al., "The SECOQC quantum key distribution network in Vienna," New Journal of Physics, Mar. 25, 2009, 38 pgs., vol. 11.

Sasaki, et al., "Field test of quantum key distribution in the Tokyo QKD Network," Optics Express, May 23, 2011, pp. 10387-10409, vol. 19, No. 11.

Stucki, et al., "Long-term performance of the SwissQuantum quantum key distribution network in a field environment," New Journal of Physics, Dec. 1, 2011, 19 pgs., vol. 13, IOP Publishing Ltd and Deutsche Physikalische Gesellschaft.

Walenta, et al., "A fast and versatile quantum key distribution system with hardware key distillation and wavelength multiplexing," New Journal of Physics, Jan. 23, 2014, 21 pgs., vol. 16, IOP Publishing Ltd and Deutsche Physikalische Gesellschaft.

Walenta, et al., "Towards a North American QKD Backbone with Certifiable Security." QCrypt2015, 5th International Conference on Quantum Cryptography, Sep. 28, 2015, 3 pgs., Tokyo, Japan, Abstract only.

Walenta, et al., "Towards a North American QKD Backbone with Certifiable Security," QCrypt2015, 5th International Conference on Quantum Cryptography, Sep. 28, 2015, 15 pgs., Tokyo, Japan, Slides only.

Walenta, et al., "Towards a North American QKD Backbone with Certifiable Security," QCrypt2015, 5th International Conference on Quantum Cryptography, Sep. 28, 2015, Tokyo, Japan, Screen grab only. <https://www.youtube.com/watch?v=P1MYAOgLLx0>.

Wang, et al., "Field and long-term demonstration of a wide area quantum key distribution network," Optics Express, Sep. 8, 2014, 18 pgs., vol. 22, No. 18.

The International Search Report and Written Opinion of the International Searching Authority for PCT Application No. PCT/US2020/033293 dated Jul. 6, 2020, 9 pages.

Aguado, Alejandro, Victor Lopez, Jesus Martinez-Mateo, Momtchil Peev, Diego Lopez, and Vicente Martin, "Virtual Network Function Deployment and Service Automation to Provide End-to-End Quantum Encryption," J. Opt. Commun. Netw. 10, pp. 421-430, 2018.

Aguado, Alejandro, et al. "Secure NFV orchestration over an SDN-controlled optical network with time-shared quantum key distribution resources." Journal of Lightwave Technology 35.8 (2017): pp. 1357-1362.

Y. Cao et al., "Experimental Demonstration of End-to-End Key on Demand Service Provisioning Over Quantum Key Distribution Networks with Software Defined Networking," 2019 Optical Fiber Communications Conference and Exhibition (OFC), 2019, pp. 1-3.

Tysowski, Piotr K., et al. "The engineering of a scalable multi-site communications system utilizing quantum key distribution (QKD)." Quantum Science and Technology 3.2 (2018): 024001.

International Preliminary Report on Patentability for counterpart international application No. PCT/US2020/033293, 7 pages, dated Feb. 28, 2022.

* cited by examiner

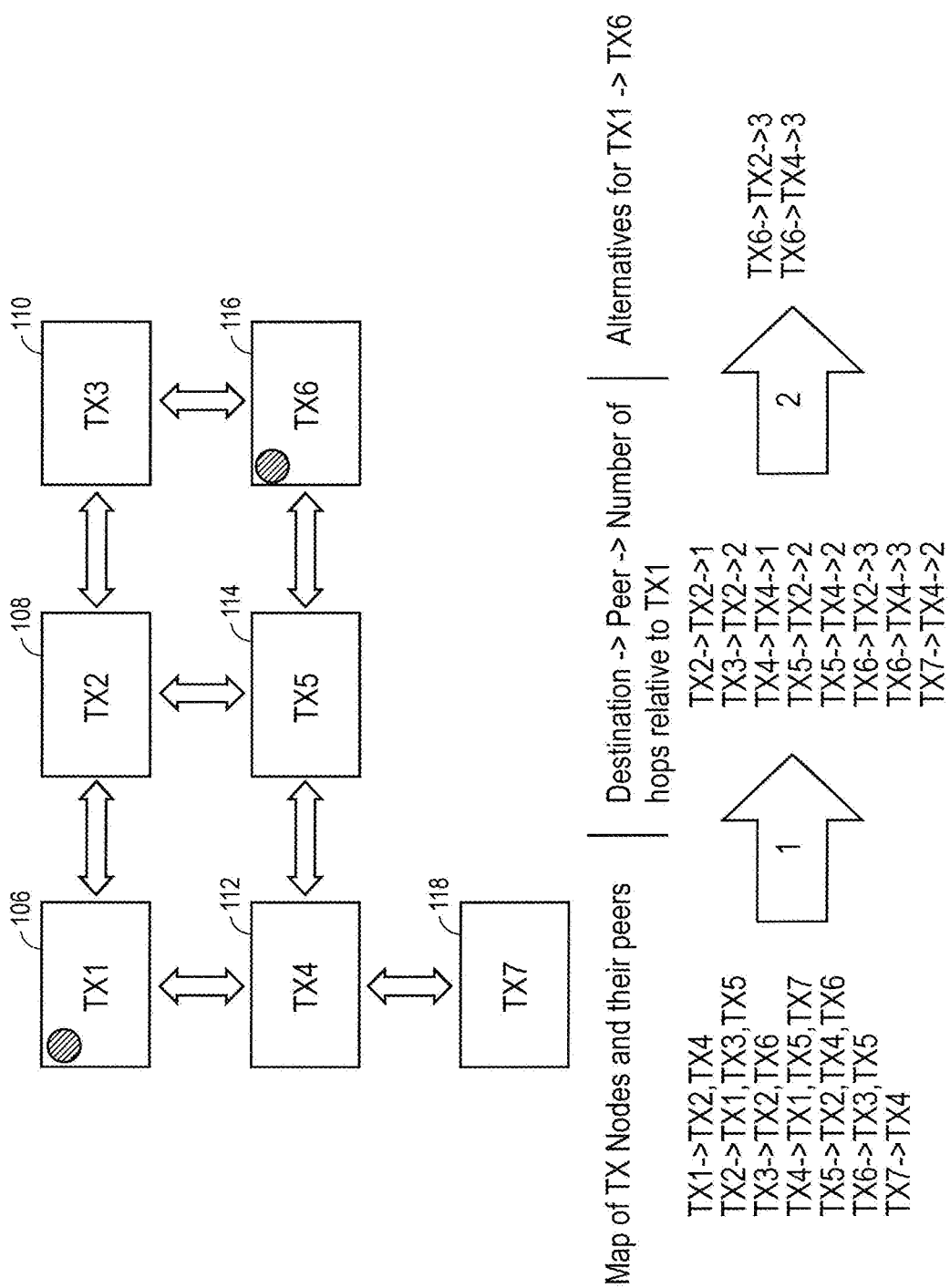

SECURE OUT-OF-BAND SYMMETRIC ENCRYPTION KEY DELIVERY

FIELD

The present embodiments relate to the fields of cryptographic communication systems and cryptographic communication in networks.

BACKGROUND

Encryption and decryption are commonly used for cryptographic communication over various networks. Typical encrypted communication uses symmetric keys to encrypt and decrypt data between 2 points. These keys are typically derived from Diffie-Hellman negotiation at the beginning of the data exchange utilizing the same link. With enough computing power, eavesdropping on the data link would allow the attacker to deduct the symmetric keys from the exchange. So far this danger was strictly theoretical, but advent of quantum computers makes this brute-force attack vulnerability very real.

QKD (Quantum Key Distribution) systems are currently being developed to provide symmetric keys to both parties with strong physical guarantee from eavesdropping. Practical usage of QKD systems is currently inhibited by limitations regarding distance and the fact of only being able to work as a pair of devices (Alice/Bob) with no capabilities to expand the network to more than pairs of Alice/Bob.

SUMMARY

A method is disclosed for secure out-of-band symmetric encryption key delivery. A first trusted node in a network receives a request. The request is from a first one of a pair of user devices. The request is to deliver symmetric encryption keys to the pair of user devices. The first trusted node delivers a second one of the symmetric encryption keys to a second one of the pair of user devices. The symmetric encryption key is delivered via further trusted nodes in the network. The first trusted node receives confirmation from one of the further trusted nodes in the network. The confirmation is of delivery of the second one of the symmetric encryption keys to the second one of the pair of user devices. The first trusted node delivers a first one of the symmetric encryption keys to the first one of the pair of user devices. This delivery is responsive to the confirmation of the delivery of the second one of the symmetric encryption keys to the second one of the pair of user devices.

A tangible, non-transitory, computer-readable media is disclosed. The media has instructions thereupon which, when executed by a processor, cause the processor to perform a method. A first trusted node in a network receives a request from a first user device. The request is to deliver symmetric encryption keys to the first user device and a second user device. From the first trusted node, a second symmetric encryption key is delivered to the second user device. The key is delivered via trusted nodes in the network. At the first node, confirmation is received from one of the trusted nodes in the network. This is confirmation of delivery of the second symmetric encryption key to the second user device. From the first trusted node in the network, a first symmetric encryption key is delivered. The first and second symmetric encryption keys are symmetric to each other. The first symmetric encryption key is delivered to the first user device, responsive to the confirmation of the delivery of the second symmetric encryption key to the second user device.

An apparatus for secure out-of-band symmetric encryption key delivery is disclosed. The apparatus has a plurality of nodes of a network that are to form trusted nodes in a peer-to-peer or mesh network. A first trusted node, which is one of the trusted nodes, is to receive a request from a first user device to deliver symmetric encryption keys to the first user device and a second user device. The first trusted node is to deliver a second symmetric encryption key to the second user device. The key is to be delivered from the first trusted node, via the trusted nodes. The first trusted node is to receive confirmation of delivery of the second symmetric encryption key to the second user device. This confirmation is to be received from one of the trusted nodes. The first trusted node is to deliver a first symmetric key to the first user device. This first symmetric key is symmetric to the second symmetric encryption key. This delivery is responsive to the confirmation of the delivery of the second symmetric encryption key to the second user device.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4 depicts an embodiment of a path calculation process, suitable for use in embodiments of the out-of-band symmetric key delivery system of FIG. 1 and the Parcel delivery depicted in FIG. 3.

DETAILED DESCRIPTION

It is important to have additional pair(s) of keys delivered outside the channel used for the data exchange. Separating the data and key delivery channels makes the brute force quantum computer attack practically impossible. Combining keys delivered inline by traditional methods and out-of-band by using systems and methods described herein allows for unobtrusive deployment on existing networks while significantly increasing an encrypted channel's resistance to attacks.

Various embodiments of a system disclosed herein remove limitations regarding distance and network expansion, work with or without the QKD system, and introduce a self-organizing mesh network of Trusted Xchange Nodes (i.e., Trusted Exchange Nodes or TX Nodes) with adaptive routing and fault tolerance, which also can benefit from additional in transit key encryption from QKD Alice/Bob pairs where available.

A cryptographic communication system with key delivery, implemented on various networks including mesh networks and peer-to-peer networks, is described herein. TX. Nodes in a network connect via TLS (Transport Layer Security) with strong encryption and mutual certificates, i.e. client validation of server and server validation of client, where client and server are defined per TLS communications.

TX Nodes communicate and cooperate to discover neighbors, generate keys per user requests, deliver key(s) to requested TX Node(s), confirm delivery of the key(s), find an optimal delivery route, find another route if one of the neighbor TX Nodes is inaccessible and repeat the procedure. In embodiments with features that can be separate, in variations, or in various combinations, the keys are encryption symmetric keys (or symmetric encryption keys), the network is a mesh network or a peer-to-peer network, and/or the keys may be additionally encrypted by external keys in each hop-to-hop transmission. External keys may be generated by connected QKD Alice/Bob pair(s), (e.g., each symmetric key being delivered is wrapped by an external key on that particular hop) in one or more, or all network hops. Some embodiments perform out-of-band symmetric key delivery in combination with peer-to-peer communication. Some embodiments perform path optimization to various criteria, such as minimizing hops, or availability of external keys, or availability of external QKD keys. Neighboring nodes in a network can establish trust and become trusted nodes in a mesh network or peer-to-peer network through one or more mechanisms, including one-way or two-way exchange or verification of certificates or tokens. Further mechanisms or protocols for establishing trust, building a mesh network or peer-to-peer network, and pre-configuring nodes to trust each other are readily devised in keeping with the teachings herein.

Figure 1:
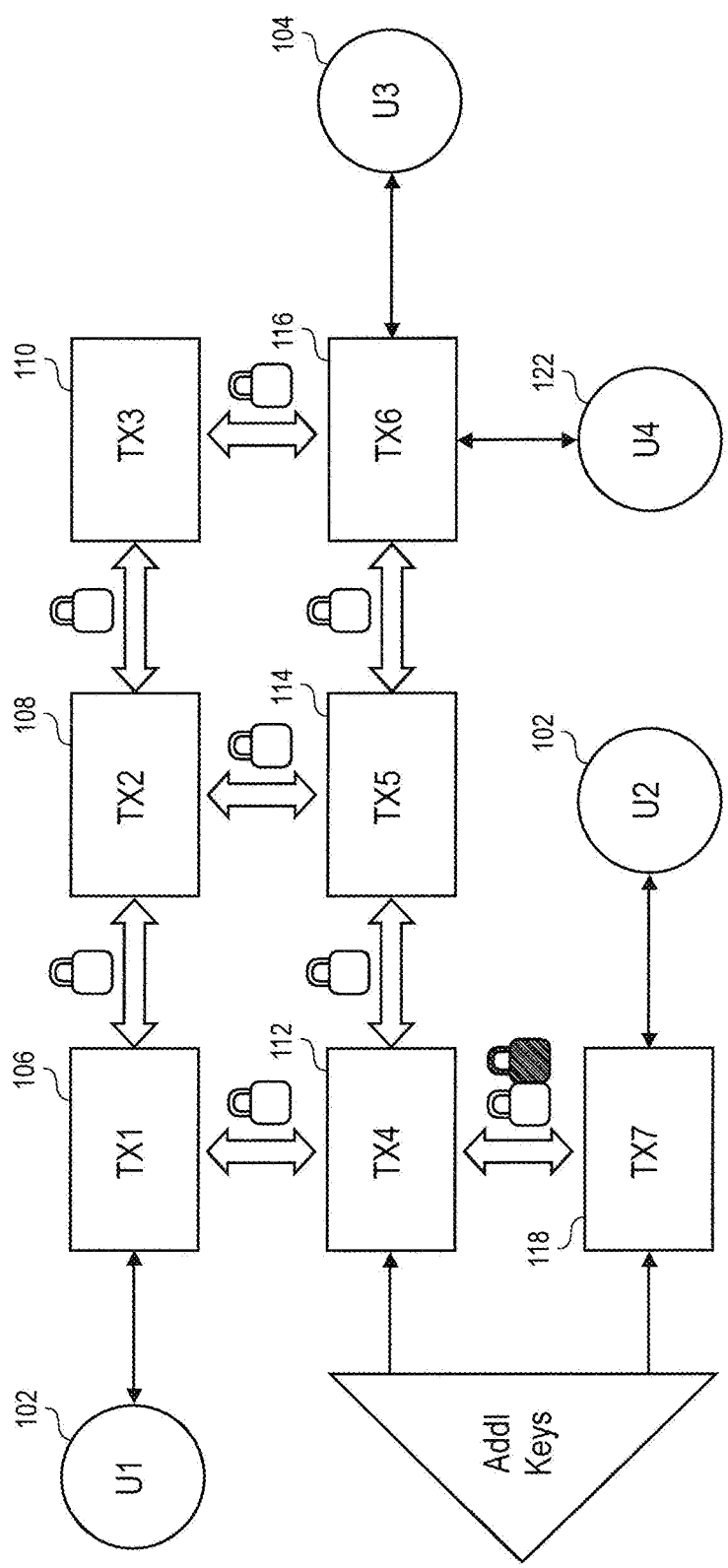
FIG. 1 depicts a system for out-of-band delivery of cryptographic keys in accordance with present embodiments. TX1 to TX7 represent Trusted Xchange Nodes (TX Nodes). U1 to U4 represent Users of the system. There is also a depiction of the system that can provide additional encryption keys, similar to, but not limited to, a QKD Alice/Bob pair.

FIG. 1 depicts a system for out-of-band delivery of cryptographic keys in accordance with present embodiments. TX1 to TX7 represent Trusted Xchange Nodes (i.e., Trusted Exchange or TX Nodes 106, 108, 110, 112, 114, 116, 118), U1 to U4 represent Users with corresponding User Devices 102, 120, 104, 122 of the system. Two user devices engage in in-band cryptographic (i.e., encrypted, decrypted) communication with each other, using cryptographic keys received through out-of-band delivery. There is also a depiction of the system that can provide additional encryption keys, similar but not limited to QKD Alice/Bob pair(s). A peer-to-peer or mesh network includes the TX Nodes 106, 108, 110, 112, 114, 116, 118 individually shown in FIG. 1, and these nodes are communicating in peer-to-peer mode with their neighbors. This communication is encrypted by TLS with both client-server and server-client certificate validation. TX Nodes only talk to neighbors which were configured by the system administrator and belong to the same Certificate Authority. Collectively, with more than two TX Nodes involved, they can create a mesh network. Some TX Nodes 108, 110, 112, 114 may not have user devices attached to them and only function as transition nodes, e.g., used for forwarding or routing. This is an important function that lets the system as a whole obtain fault tolerance and also allows for secondary encryption performed with external keys from limited-range QKD Alice/Bob pairs. The peer-to-peer or mesh network, and more specifically the TX Nodes 106, 108, 110, 112, 114, 116, 118 in the network, perform a process to deliver cryptographic keys between any given pair of user devices 102, 120, 104, 122 connected to the network. Processors executing software, firmware, hardware, and various combinations thereof can perform the various actions of this and other processes in various embodiments. Connections in the peer-to-peer or mesh network can be one-to-one (e.g., an end TX Node), many-to-one, or many-to-many, in various embodiments.

TX Nodes 106, 108, 110, 112, 114, 116, 118 periodically communicate with their pre-configured neighbors, pulling, the information about neighbors of the neighbors and all the connected User Devices. Thus, in case of a Mesh setup, each TX Node 106, 108, 110, 112, 114, 116, 118 maintains a near-real-time map of all nodes in the Mesh and all active User Devices while only requesting the information from the allowed neighbors. This Map automatically changes if new TX Nodes/User Devices are added/removed by the System Admin or if some nodes become inaccessible.

In one scenario, one of the User Devices 102, for example U1, requests key(s). U1 also specifies another User Device 104 which should receive the same key(s), for example U3. The request for keys is sent to the TX Node 106 this User Device 102 is connected to, in this example TX1. The key request is performed in accordance to mutually agreed specifications and may include TLS encryption and certificate validation and may be performed, e.g., via REST API (Representational State Transfer Application Programming Interface). As another variant, it can be performed via serial communication in a format both User Device and TX Node agree upon.

Upon receiving the request, a TX Node 106 (TX1 in this example) generates the requested key(s) and prepares to deliver them to the U3 first before returning the keys to the requestor user device 102 (U1). TX1 looks up the name of the TX Node 116 that U3 is connected to, in this example TX6. TX1, being only allowed to talk to its pre-configured neighbors, in this case TX Nodes 108, 112 TX2 and TX4, calculates the next hop based on its current nodes Map. In this example TX Node 106 TX1 will see several equal-length paths—i.e., both TX2 and TX4 would have equal weight. In other examples, paths could have different weighting. In this example TX1 will perform a load-balancing action and send the generated key to TX4 if the previous key delivery transaction was performed via TX2 and vice-versa. The internal data block is called a Parcel and has a destination TX Node label attached to it. Upon receiving this Parcel from TX1, TX4 will perform a similar calculation of next hop and find out that TX4 has only one alternative—namely, TX Node 114 TX5. The operation of optimal path calculation and potential load-balancing is performed on every transitional TX Node (hop) until the Parcel reaches its destination TX Node 116 (in this example TX6). Each TX Node in the chain keeps the connection from the previous peer open in this transaction so any potential error is immediately returned within the context of this transaction. Upon successful delivery of the Parcel with the keys to TX6, TX1 returns a success code and closes the connection. Each previous TX Node does the same until the success code reaches the originator (in this example TX1). Upon receiving the success code, TX1 finally returns the requested key(s) to the U1 User Device 102. With key(s) successfully delivered to TX6, U3 can now request the key(s) after which the key(s) are erased from TX6. There is no storage of the delivered keys in transitional TX Nodes beyond the time of the Parcel delivery transaction.

The system can be configured such that TX Nodes supplied with additional encryption keys receive the path priority, for example by according greater weight to such paths. In case of additional keys, for example from a QKD Alice/Bob pair, TX Nodes additionally encrypt/decrypt the Parcel using those keys on both sides of that particular hop. Such quantum key encryption and decryption can occur on one hop, two or more hops, or each and every hop of the Parcel along a path, in various embodiments.

The TX Node that generates the keys on request for delivery could get the Key Material from a pre-configured RNG (Random Number Generator) system, including but not limited to a QKD system, or a specialized QRNG (Quantum Random Number Generator), from an internal hardware RNG or from a standard software entropy-based RNG, or generate keys in various embodiments.

Figure 2:
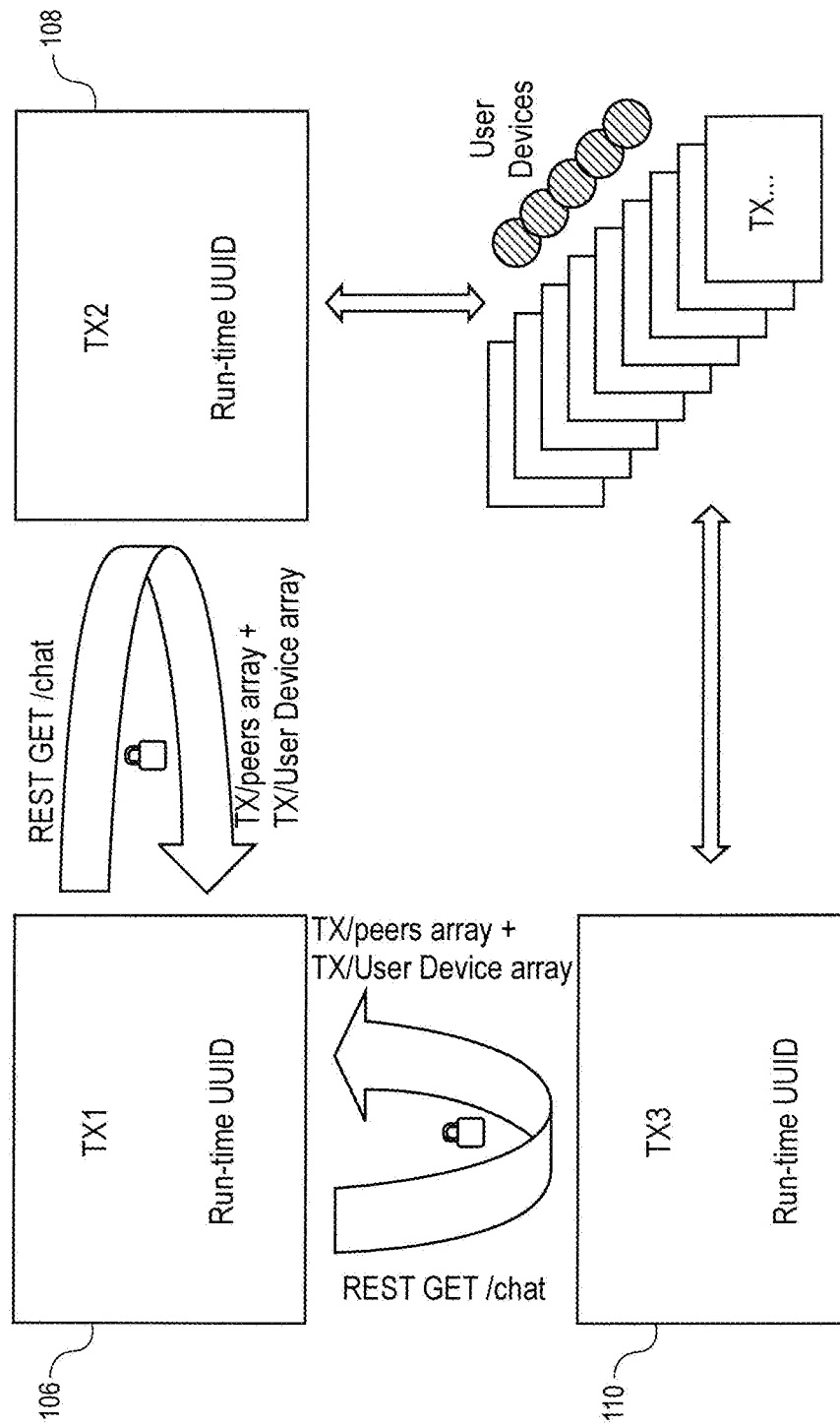
FIG. 2 depicts a TX Node information collection loop ("chat with the neighbors") from the perspective of Node TX1, suitable for use in embodiments of the TX Node network of FIG. 1.

FIG. 2 depicts an embodiment of the information collection loop ("chat with the peers") from the perspective of TX Node 106 TX1. Each Node 106, 108, 110 in the network must have a unique name. In this example node TX1 is pre-configured by a System Administrator so that TX1 is allowed to talk to Nodes TX2 and TX3. The exchange is implemented via REST API over TLS with both client-server and server-client certificate validation. TX1 in this example runs an independent "chat" thread per each peer Node that TX1 is configured to talk to. TX1 initiates a REST 'GET/chat' request with pre-set interval T to TX2 and TX3. Each TX Node generates a one-time UUID (Universally Unique Identifier) that lasts while a TX Node process is running and is replaced when the process restarts. There is no long-term storage for this UUID. This UUID is supplied alongside of the TX Node name in each response to a "chat" request. In this example, TX1 receives information from each of its peers that is structured as an array of ([TX Name, TX UUID]→array of (peer names), array of (User Device names)), although other ways of organizing and recording this information are readily devised in keeping with the teachings herein. TX1 then creates memory structures for lookups for where User Devices are located and which TX Node knows which peers. TX1 also checks for changes of UUID associated with TX Names and replaces appropriate lookup slots when a MID has changed. TX1 also marks TX name/UUID pair as "stale" if TX1 did not see that particular UUID in responses in T×2 time. Absence of that UUID in more than T×2 time indicates that the TX Node in question is inaccessible and must be avoided during the path calculations. In the example in FIG. 2, all other Nodes perform similar REST "chat" requests to each other, thus building a collective picture of the TX Node network while only talking to allowed peers. Each TX Node 106, 108, 110 keeps its own copy of this collective memory as the TX node is relative to it. If the UUID/TX name pair was not seen within T×11 timeframe—the TX Node in question is removed from the picture completely. Otherwise it has a chance to be marked as an operational node again. Various further time frames or tests for removal and/or restoration of a node to the network are readily devised in keeping with the teachings herein.

The run-time UUID refresh, method was chosen for various embodiments because it does not rely on the notion of global time that otherwise needs to be maintained across the TX Node network. Each TX Node 106, 108, 110 only relies on its own clock to calculate the "stale" timeouts and each TX Node clock can be skewed significantly without affecting inter-operability and collective memory. There are no timestamps exchanged in "chat" request/response, in some embodiments.

The GET method of REST API was chosen as most secure so no "impostor" TX Node can inject the incorrect information into the collective memory by just pushing the incorrect information, even if somehow the "impostor" TX Node passes the certificate validation.

Path finding thus embodies a TX Node receiving the Parcel with the keys for delivery and finding the next optimal peer TX Node to give this parcel to, based on the current TX Node network picture the TX node created in memory.

There is no permanent storage of the network memory on any TX Node, in some versions.

Approximate time of propagation of the newly configured TX Node across the network is bracketed between T×L and T×L×2 where L is the length of the chain from TX1 (as in the FIG. 2. example) to the TX Node in question. Thus, propagation time in the network is linear relative to the length of the chain of TX nodes.

Time to mark the Node (i.e., TX Node) "stale", on the other hand, is of less significance because next hop calculation happens immediately on the TX Node that currently holds the Parcel with the keys and needs to find the next hop, independently of what other Nodes know about the current state of the Network. Relative to this Node this time is constant and bracketed between T and T×2.

Figure 3:
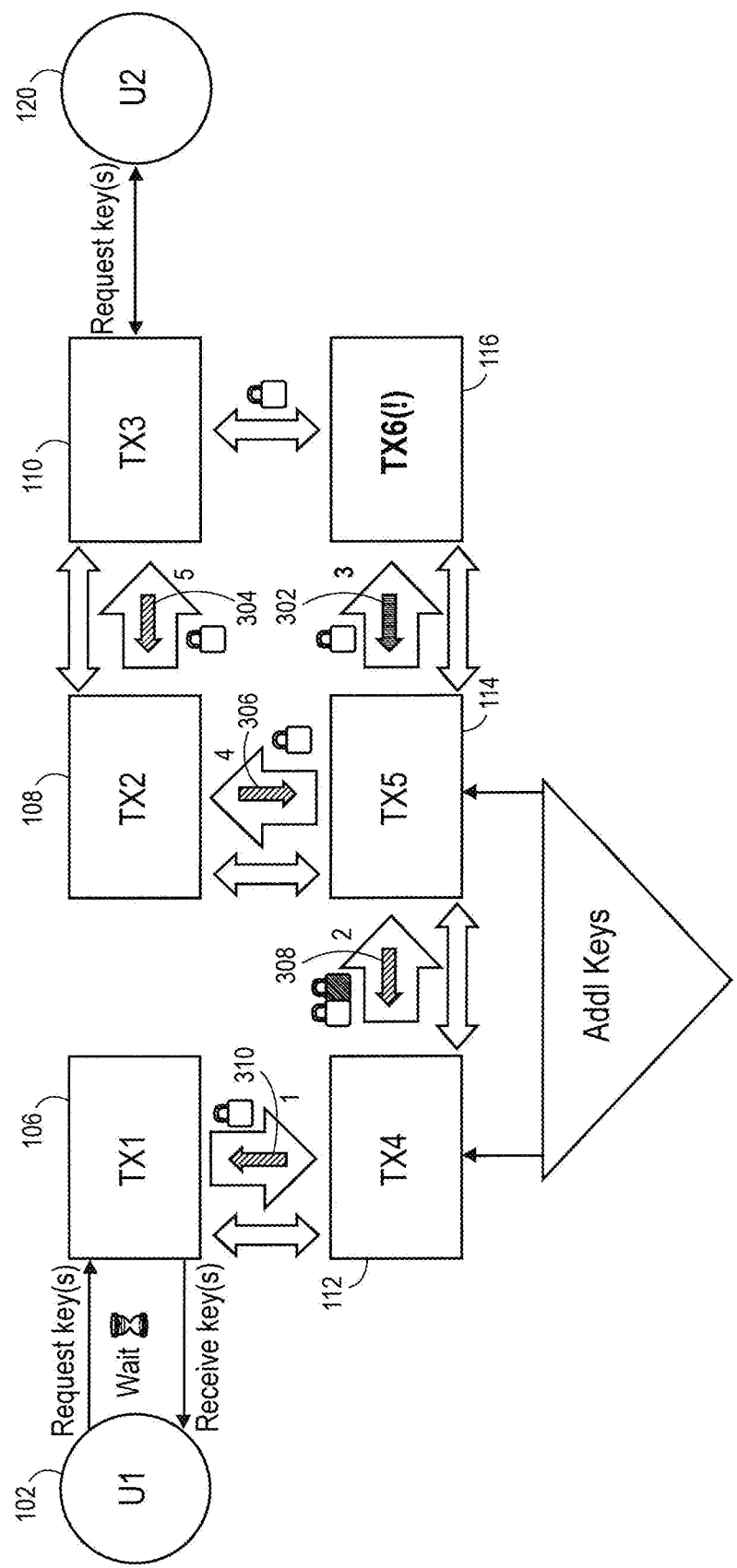
FIG. 3 depicts an out-of-band encryption key(s) ("Parcel") delivery in the Mesh of TX Nodes in accordance with present embodiments.

FIG. 3 depicts an out-of-band encryption key(s) ("Parcel") delivery in the Mesh of TX Nodes 106, 108, 110, 112, 114, 116 in accordance with present embodiments. This example also covers the rare situation when TX Node 116 TX6 is experiencing problems (or became unavailable) very recently so the information about this failure did not yet propagate through the Mesh "Chat" as described above.

Per example in FIG. 3, the TX Nodes Mesh is configured as follows: TX1 talks to TX4; TX4 talks to TX1 and TX5; TX5 talks to TX2 and TX6; TX2 talks to TX5 and TX3; TX3 talks to TX2 and TX6; TX6 talks to TX5 and TX3.

User Device 102 U1 requests the encryption keys from the TX Node 106 TX1 and also specifies its counterpart User Device 120 U2 which should receive the same key(s). U1 then waits for response. TX1 generates the requested key(s) and generates the Parcel. TX1 finds the TX Node 110 that U2 is connected to from the current node map of TX1. This TX Node 110 happens to be the TX3. Thus, the Parcel is formed with the final destination specified as TX3. TX1 then sends the Parcel to its only peer, TX4 as Step 1 and waits for response. TX4 sends the parcel to TX5 in exactly same manner in Step 2 and waits for response.

TX4 and TX5 also happen to receive the additional symmetric encryption keys from external devices—for example, quantum keys from a QKD Alice/Bob pair. Thus, in addition to a TLS layer for the communication, the Parcel itself is encrypted using those quantum keys.

TX5 would normally be aware that its peer TX6 has problems by performing the Chat with time interval T, but in this very rare case TX6 is experiencing difficulties or became unavailable in a time frame bracketed between 0 and T. So TX5 still thinks that its peer TX6 is operational and has equal-path load-balancing opportunity between TX2 and TX6. If TX6 is finally chosen as a next hop, TX5 sends the Parcel to TX6 in Step 3. The Error response 302 (or timeout) is raised (response arrow) and TX5 then sends the Parcel to its other peer TX2 in Step 4 and waits for response. TX2 sends the Parcel to TX3 in Step 5 and waits for response.

TX3 sees that the Parcel destination matches its name and perform actions in accordance with the method e.g., through an Application Programming Interface (API) for the User Device key(s) delivery. The parcel is deleted immediately after the key(s) are retrieved by the User Device 120 U2.

TX3 then returns a Success response 304 (response arrow) to TX2 and closes the transaction. TX2 returns a Success response 306 to TX5 and closes the transaction. TX5 returns a Success response 308 to TX4 and closes the transaction. TX4 returns a Success feedback 310 to TX1 and closes the transaction. TX1 gives the key(s) to waiting User Device 102 U1 in accordance with the method (e.g., through an API) for the User Device key(s) delivery and closes the transaction.

Typical delivery would involve TX5 learning about TX6 problems from the Chat and marking TX6 as Stale. This knowledge also propagates across all the nodes in the Mesh via Chat as described above. In this typical case the Parcel delivery path would consist of Steps 1, 2, 4 and 5—avoiding Step 3 altogether.

The Parcel delivery is implemented using REST method "POST/parcel". The Parcel is never stored on HDD (hard disk drive) or other storage memory while in transit to a User Device and is immediately deleted from memory after retrieval by the User Device.

It is typical that a User Device and its associated TX Node perform both client/server and server/client certificate validation and/or are connected via an otherwise highly-secure link, which may be implemented via serial interface for example.

FIG. 4 depicts an embodiment of a path calculation process, suitable for use in embodiments of the out-of-band symmetric key delivery system of FIG. 1 and the Parcel delivery depicted in FIG. 3. In the FIG. 4 example, TX Node 106 TX1 is the initiator of the Parcel delivery to the TX Node 116 TX6. Tx Node 106 TX1 keeps the current map of all the nodes in the Mesh and their peers as obtained via Chat as described above.

TX1 uses Step 1 to create a just-in-time map consisting of all the possible destinations, peers of TX1 through which those destinations are accessible, and number of hops to take to deliver to a particular destination via a particular peer. Stale TX Nodes are excluded from mapping.

TX1 then uses Step 2 to filter out all irrelevant records so only TX6 remains as a destination. In FIG. 4 example it yields 2 records with an equal number of hops. So TX1 switches to load-balancing mode and sends Parcels in round-robin fashion alternatively to TX2 and TX4.

As the original Map obtained from Chat changes, so does the Just-in-Time hop map which is being produced fresh on every Parcel delivery. As an example, when TX2 receives the Parcel destined to TX6, TX2 performs identical calculation taking its copy of the current map of all the nodes and their peers as obtained via Chat and, converting the map to an all possible destinations map with hops count, only now relative to the TX Node 108 TX2 (itself), and then filtering out by destination TX6. This will yield TX6→TX3→2 and TX6→TX5→2 alternatives which trigger again the load-balancing round-robin between TX3 and TX5. One will be chosen and the next identical step will result in delivery of the Parcel to the TX Node 116 TX6.

Path calculation happens on each TX Node 106, 108, 110, 112, 114, 116, 118 independently, on every Parcel delivery based on the freshest information obtained from the Chat as described above.

The above-described embodiments, examples and scenarios are generalizable to further embodiments in which a request to deliver symmetric encryption keys to user devices is received at a TX Node that is not directly connected to a user device, but which communicates with the user device(s) through further TX Node(s). The TX node that receives the request for symmetric encryption keys from a user device delivers one of the symmetric encryption keys to another specified user device, receives confirmation of delivery, then delivers the other symmetric encryption key to the user device that requested the keys, all through TX Nodes.

The forgoing specification references specific exemplary embodiments. It will, however, be evident that various modifications and changes may be made thereto without departing from the broader spirit and scope intended. The specification and drawings are accordingly to be regarded in an illustrative rather than a restrictive sense.

What is claimed is:

1. A method for secure out-of-band symmetric encryption key delivery, comprising:
receiving, at a first trusted node in a network, a request from a first one of a pair of user devices to deliver symmetric encryption keys to the pair of user devices, the request to be interpreted by the first trusted node as an instruction to generate the symmetric encryption keys in response to receiving the request, deliver one of the symmetric encryption keys to a second one of the pair of user devices in response to receiving the request, confirm delivery of the one of the symmetric encryption keys to the second one of the pair of user devices, and after confirming such delivery in response to receiving the request, deliver another one of the symmetric encryption keys to the first one of the pair of user devices;
generating, at the first trusted node, a first one and a second one of the symmetric encryption keys, in response to receiving the request, wherein neither the first one nor the second one of the pair of user devices has one of the symmetric encryption keys as a result of the generating prior to the deliveries;
delivering, from the first trusted node via the trusted nodes in the network, the second one of the symmetric encryption keys to the second one of the pair of user devices, in response to receiving the request;
receiving, at the first trusted node, from one of the trusted nodes in the network, confirmation of the delivery of the second one of the symmetric encryption keys to the second one of the pair of user devices that was in response to the first trusted node receiving the request; and
delivering, from the first trusted node in the network, a first one of the symmetric encryption keys to the first one of the pair of user devices, responsive to the confirmation of the delivery of the second one of the symmetric encryption keys to the second one of the pair of user devices that was in response to the first trusted node receiving the request.

2. The method of claim 1, wherein the first and second ones of the symmetric encryption keys are guaranteed by the trusted nodes to be delivered to only the first and second ones of the pair of user devices.

3. The method of claim 1, wherein the delivering the second one of the symmetric encryption keys comprises delivering the second one of the symmetric encryption keys through the network between nodes that are pre-configured to trust each other as trusted nodes.

4. The method of claim 1, wherein the trusted nodes in the network comprise nodes in a peer-to-peer or mesh network each in a one-to-one, one-to-many, or many-to-many configuration.

5. The method of claim 1, further comprising:
performing just-in-time optimal pathfinding during delivery of the first and second ones of the symmetric encryption keys.

6. The method of claim 1, further comprising:
performing just-in-time load-balancing during delivery of the second one of the symmetric encryption keys.

7. The method of claim 1, further comprising:
generating and delivering quantum keys to each of two or more trusted nodes in the network.

8. The method of claim 1, further comprising:
encrypting each of one or more node to node transmissions with a quantum key, during delivery of the first and second ones of the symmetric encryption keys.

9. The method of claim 1, further comprising:
performing just-in-time optimal pathfinding based on availability of quantum keys during delivery of the first and second ones of the symmetric encryption keys.

10. A tangible, non-transitory, computer-readable media having instructions thereupon which, when executed by a processor, cause the processor to perform a method comprising:
receiving, at a first trusted node in a network, a request from a first user device to deliver symmetric encryption keys to the first user device and a second user device, the request to be interpreted by the first trusted node as an instruction to generate the symmetric encryption keys in response to receiving the request, deliver one of the symmetric encryption keys to the second user device in response to receiving the request, confirm delivery of the one of the symmetric encryption keys to the second user device, and after confirming such delivery in response to receiving the request, deliver another one of the symmetric encryption keys to the first user device;
generating, at the first trusted node, a first and a second symmetric encryption key, in response to receiving the request, wherein neither the first nor the second device has one of the symmetric encryption keys as a result of the generating prior to the deliveries of the symmetric encryption keys;
delivering, from the first trusted node via trusted nodes in the network, the second one of the symmetric encryption key to the second one of the pair of user devices, in response to receiving the request;
receiving, at the first trusted node, from one of the trusted nodes in the network, confirmation of the delivery of the second symmetric encryption key to the second user device that was in response to the first trusted node receiving the request; and
delivering, from the first trusted node in the network, the first symmetric encryption key, first and second symmetric encryption keys being symmetric to each other, to the first user device, responsive to the confirmation of the delivery of the second symmetric encryption key to the second user device that was in response to the first trusted node receiving the request.

11. The tangible, non-transitory, computer-readable media of claim 10, wherein the method further comprises:
preconfiguring nodes in the network to trust each other as trusted nodes in a mesh network or peer-to-peer network.

12. The tangible, non-transitory, computer-readable media of claim 10, wherein the method further comprises:
performing just-in-time optimal pathfinding in the network.

13. The tangible, non-transitory, computer-readable media of claim 10, wherein the method further comprises:
performing just-in-time load-balancing in the network.

14. The tangible, non-transitory, computer-readable media of claim 10, wherein the method further comprises:
generating quantum keys in two or more neighboring trusted nodes; and
encrypting and decrypting the first or the second symmetric encryption key, using the quantum keys.

15. An apparatus for secure out-of-band symmetric encryption key delivery, comprising:
a plurality of nodes of a network to form trusted nodes in a peer-to-peer or mesh network; and
a first trusted node, of the trusted nodes, to:
receive a request from a first user device to deliver symmetric encryption keys to the first user device and a second user device, the request to be interpreted by the first trusted node as an instruction to generate the symmetric encryption keys in response to receiving the request, deliver one of the symmetric encryption keys to the second user device in response to receiving the request, confirm delivery of the one of the symmetric encryption keys to the second user device, and after confirming such delivery in response to receiving the request, deliver another one of the symmetric encryption keys to the first user device;
generating, at the first trusted node, first and second symmetric encryption keys, in response to receiving the request, wherein neither the first user device nor the second user device devices has one of the symmetric encryption keys as a result of the generating prior to the deliveries;
deliver, from the first trusted node via the trusted nodes, the second symmetric encryption key to the second user device, in response to receiving the request;
receive, from one of the trusted nodes, confirmation of the delivery of the second symmetric encryption key to the second user device that was in response to the first trusted node receiving the request; and
deliver, from the first trusted node, a first symmetric encryption key that is symmetric to the second symmetric encryption key, to the first user device, responsive to the confirmation of the delivery of the second symmetric encryption key to the second user device that was in response to the first trusted node receiving the request.

16. The apparatus of claim 15, wherein the trusted nodes are further to:
perform just-in-time optimal pathfinding in the peer-to-peer or mesh network.

17. The apparatus of claim 15, wherein the trusted nodes are further to:
perform just-in-time load-balancing in the network.

18. The apparatus of claim 15, wherein the trusted nodes are further to:
generate quantum keys in two or more neighboring trusted nodes; and
encrypt and decrypt the first or the second symmetric encryption key during delivery, using the quantum keys.

19. The apparatus of claim 15, wherein the trusted nodes are further to:
    use encryption and decryption with quantum keys, for each node to node transmission during delivery of the first and second symmetric encryption keys.

20. The apparatus of claim 15, wherein the trusted nodes are further to:
    perform just-in-time optimal pathfinding based on availability of quantum keys during delivery of the first and second symmetric encryption keys.

\* \* \* \* \*